(12) United States Patent
Schell et al.

(10) Patent No.: US 6,684,213 B1
(45) Date of Patent: Jan. 27, 2004

(54) METHODS AND SYSTEMS FOR STRATEGIC PRIORITY ORDER TRACKING

(75) Inventors: Harry Michael Schell, Brandon, MS (US); Watson Lee Dorn, Jr., Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 242 days.

(21) Appl. No.: 09/883,772

(22) Filed: Jun. 18, 2001

(51) Int. Cl.[7] .............................................. G06F 17/30
(52) U.S. Cl. ..................................... 707/10; 707/104.1
(58) Field of Search ............................... 707/10, 104.1; 705/34; 379/29.01, 201.04

(56) References Cited

U.S. PATENT DOCUMENTS

| | | | | |
|---|---|---|---|---|
| 4,922,514 A | * | 5/1990 | Bergeron et al. | ........ 379/29.01 |
| 5,428,679 A | * | 6/1995 | French | .................. 379/201.04 |
| 5,696,906 A | * | 12/1997 | Peters et al. | .................. 705/34 |
| 5,881,131 A | * | 3/1999 | Farris et al. | ............. 379/15.03 |

* cited by examiner

Primary Examiner—Diane D. Mizrahi
(74) Attorney, Agent, or Firm—Cantor Colburn LLP

(57) ABSTRACT

The present mechanism relates generally, to systems and methods for computerized order tracking and, more particularly, to systems and methods for computerized tracking of order information contained in Legacy databases. An interactive web-based application tracks orders through various Legacy databases that are used in telecommunications order processing and monitoring. The summary and prioritization of identified service order status provides an important tool to track, escalate, and identify the need for management action to better ensure that service commitments are met. The present mechanism replaces the manual, paper-based order tracking system, thereby allowing more time to be spent on managing the process.

17 Claims, 16 Drawing Sheets

BELLSOUTH® spot

SOCS Status of PF

| Escalate Level | Order Number | Due Date | SO Status | TIRKS Status | Service Code | Group Holding | Time to Next Escalation | Next Int. Crit. Date | Interval | Ready for ZFOC |
|---|---|---|---|---|---|---|---|---|---|---|
| 0 | N6GF5TK5 | | PF | P | IBSD | AFIG | 10:01:22 AM | | tbd. | Ready |
| 0 | N6BYPY90 | | PF | P | DHDM | | 4:47:36 PM | | tbd. | Complete |
| 0 | C68XW898 | | PF | P | LXFU | CPG | 2:23:16 PM | | tbd. | Not Required |
| 0 | N671V9M1 | | PF | E | QGDA | SAC | 10:15:35 AM | | tbd. | Not Required |
| 0 | C65HF658 | | PF | E | HCGS | AFIG | 10:05:07 PM | | tbd. | Not Ready |
| 0 | C69Q1206 | | PF | P | HCGS | SAC | 10:05:19 PM | | tbd. | Complete |
| 0 | N6FNBM24 | | PF | E | IBSD | SAC | 10:47:41 AM | | tbd. | Not Required |
| 0 | N61WKQK7 | | PF | E | DBCG | SAC | 9:44:29 AM | | tbd. | Not Required |
| 0 | C61QT87 | | PF | E | LYFU | AFIG | 10:25:36 | | tbd. | Not Required |

METHODS AND SYSTEMS FOR STRATEGIC PRIORITY ORDER TRACKING

FIELD OF THE INVENTION

The present invention relates generally, to systems and methods for computerized order tracking and, more particularly, to systems and methods for computerized tracking of order information contained in Legacy databases.

BACKGROUND OF THE INVENTION

Telecommunication service providers, such as the Regional Bell Operating Companies ("RBOCs"), frequently have large customer service orders with other telecommunications companies. Such large service orders generally involve the design of telecommunication circuits and then the testing of the circuits. It is imperative to both the service provider and the customer that these orders get completed on time.

As a result, the RBOCs utilize Network Provisioning Resolution Centers ("NPRC") to monitor the progress of these large service customer orders. The NPRC monitors the progress of the orders and alerts various concerned parties about the status of the orders. The NPRC gathers information from databases in the Legacy systems in order to retrieve the information necessary to monitor the orders.

For the RBOCs, the Legacy systems include a collection of databases established by the Bell System and currently managed by Telcordia. The databases accessed by the NPRC are the: Trunk Integrated Record Keeping System ("TIRKS"), Service Order Analysis and Control ("SOAC"), Service Order Communications System ("SOCS"), Work and Force Administration/Control ("WFA/C"), Work and Force Administration/Dispatch In ("WFA/DI"), Work and Force Administration/Dispatch Out ("WFA/DO"), Digital Provisioning ("DPRO"), and Loop Facility Assignment Control System ("LFACS"). These databases are on different computer platforms and utilize different operating systems and database software. Each database contains certain information used by the NPRC to assist it in tracking orders.

TIRKS supports the total circuit provisioning process. The data and documents contained in TIRKS include: circuit order control, circuit design, inventory record maintenance, selection and assignment of components of inventory work order generation to satisfy requests for communication services, and construction planning and forecasting.

SOAC receives service orders from the service order processor ("SOP"), parses the Field Identifiers ("FIDs") and Universal Service Order Codes ("USOCs"), generates loop facility and central office assignment requests, and sends assigned orders back to the SOP and to other provisioning systems.

The primary function of SOCS is the real-time routing of formatted service orders via the Queued Message Service/BellSouth Open System Information Platform ("QMS/BOSIP") to physical printers, PCs, and mini-computers to support the provisioning and completion of service orders. SOCS is responsible for the collection, storage, and distribution of service orders to all user departments, including the service order driven mechanized systems. This system routes service orders to over one hundred thirteen separate entities and feeds over twenty-five other mechanized systems that are needed to provide service to the customer and bill the customer. SOCS is also responsible for producing administrative reports.

The WFA systems are Telcordia application products that help coordinate personnel assignments and manage/automate the tasks required to install and repair facilities, trunks, special service circuits, and residential lines. WFA/C coordinates and tracks installation and maintenance activity of the entire circuit, from design to completion, and provides ready access to detailed circuit records and circuit history data. WFA/DI automates the work assignments of central office technicians to install and maintain "designed" as well as certain "non-designed" services. WFA/DO supports the outside field technicians for Special Services ("SSIM"), and the inside personnel in the Special Service Dispatch Administration Center ("SSDAC"). The system eliminates the paper flow and manual work involved in administration of the SSIM dispatch, and provides pricing and loading for these personnel.

DPRO is designed to reduce the provisioning interval for DS1 (DS1 and above is a measure of digital bandwidth that exceeds 1.544 MB) services to external customers by automating the information flow from SOAC/SOCS through DPRO, with data from LFACS and Loop Electronics Inventory Module ("LEIM"), to TIRKS. DPRO provides span design information from Outside Plant Engineering ("OSPE") to all appropriate downstream organizations.

The current NPRC process for monitoring orders is a highly manual and time consuming process. Much time is spent performing manual inquiries into the Legacy system databases, recording information and making notes, organizing by priorities, marking calendars for follow up, and determining what needs to be done next. The manual tracking of orders carries with it the risks of miscommunication, lack of standardization, and improper prioritization. The existing manual, paper-based process is shown in FIG. 1.

First, order printouts of the top priority orders that need to be monitored are periodically collected and physically delivered to an NPRC representative. At the NPRC, the orders are logged, separated, and filed in folders. An NPRC representative must then access each Legacy system separately to individually check the status of each order. Each Legacy system has some of the information necessary to check the status of an order. An NPRC representative accesses the Legacy systems through a character user interface ("CUI") on a personal computer. As a result, an NPRC representative must have several "green screens" open at once and must navigate through the non-user-friendly Legacy systems. This is not a point and click environment. The user must open several screens from different databases to obtain the necessary information. The user cannot maneuver back and forth from screen to screen in this environment with a click of the mouse or the "Back" and "Forward" buttons of a web browser as computer users are so accustomed to today. Additionally, the user must examine multiple screens, up to ninety-five Legacy transactions per order, looking for all the necessary information. It cannot be gleaned simply from a single screen. This is time consuming and uses valuable human resources.

Once the NPRC has the status for an order, the status of the order is then manually filed in paper form. Based on the written status and manual prioritization, an NPRC representative makes follow-up calls to those people or organizations who must be informed of the status of certain orders. An NPRC representative then marks any necessary follow ups for particular orders on a physical calendar and must continue to monitor the status.

There are numerous problems with this manual process. First, the manual process is very cumbersome and time consuming, and thus the number of orders that can be managed efficiently is limited. This results in orders that are not managed at all or are managed inefficiently, which in turn results in deadlines being missed and dissatisfied customers. Additionally, when intermediate deadlines are missed, the targeted interval is shortened for the portion of the provisioning at the end of the work period, which results in inefficiency of scheduling and increased overtime. All of these problems result in lost revenue.

SUMMARY OF THE INVENTION

The present invention interacts with all necessary Legacy systems providing the key provisioning centers with the ability to track orders both in their respective systems as well as through the overall "big picture" of the order's lifecycle. This allows users quicker access to key data from several systems in a single place rather then having to review several different systems at the same time. The presentation of the critical fields together and the application of business logic to prioritize these orders helps the various provisioning center users better control the provisioning process.

The present invention collects service order information from various Legacy systems and provides a sorted and ordered view of the current order status, location in the service provisioning process, and current remarks or issues related to meeting the Committed Due Date ("CDD") of an order. The present invention also tracks other designed orders, providing parity to all services. The summary and prioritization of identified service order status provides an important tool to track, escalate, and identify the need for management action to better ensure that service commitments are met. The application has the ability to track Inter-Exchange Carrier ("IEC"), Bellsouth Business Systems (Non-Access) ("BBS"), and Competitive Local Exchange Carriers ("CLEC") SL2 orders for members of the NPRC, Work Management Center ("WMC"), Circuit Provisioning Group ("CPG"), Access Customer Advocate Center ("ACAC"), Service Advocate Center ("SAC"), and other Bellsouth Telecommunications groups. CLEC SL2 orders are those placed by the CLEC under the design tariff. The present invention is also capable of tracking SL1, or non-designed, orders.

The present invention is an interactive web-based application that tracks all NPRC-controlled orders through various Legacy systems used in the provisioning process. The present invention allows users (NPRC and others) to track and analyze an order in real time and escalate problems to the appropriate group. This greatly increases the efficiency of the NPRC, which currently tracks orders manually. Additionally, service-order based information is collected and stored to allow proactive root cause analysis. Information about a service order is stored and managed within the system using a relational database. Escalation mechanisms are built into the system and inform NPRC users when there is a need to escalate based on rules defined in the database. Furthermore, the present invention allows direct updates to Legacy systems to be performed.

The present invention also does the following: provides all provisioning groups with the ability to forecast load-balancing and work effort within their areas in order to meet Intermediate Critical Dates ("ICDs"); customizes escalation timers in order to notify NPRC users if CDD or ICD is at risk; collects "real time" (within one hour) metrics to support performance analysis; presents an easily navigable web-page of CDD and all designed services critical data drawn from multiple systems presenting a single data screen to the user; provides content, context, and individual system-sensitive dynamic on-screen help procedures; allows the user to make updates to several systems from a single screen interface; and gives outside customers the ability to request appropriate information on and the current status of their service requests.

The present invention replaces the manual, paper-based order tracking system described above with an automated web-based system. By eliminating the manual effort, more time is spent on managing the process and more orders are managed. This allows for a faster commitment to the customer on an order and a higher degree of CDDs being met.

BRIEF DESCRIPTION OF THE DRAWINGS

FIG. 10 shows a list of work orders, with numerous characteristics for each order.

FIG. 13 shows a screen shot where a centrally-administered user profile is maintained.

DETAILED DESCRIPTION

Figure 1:
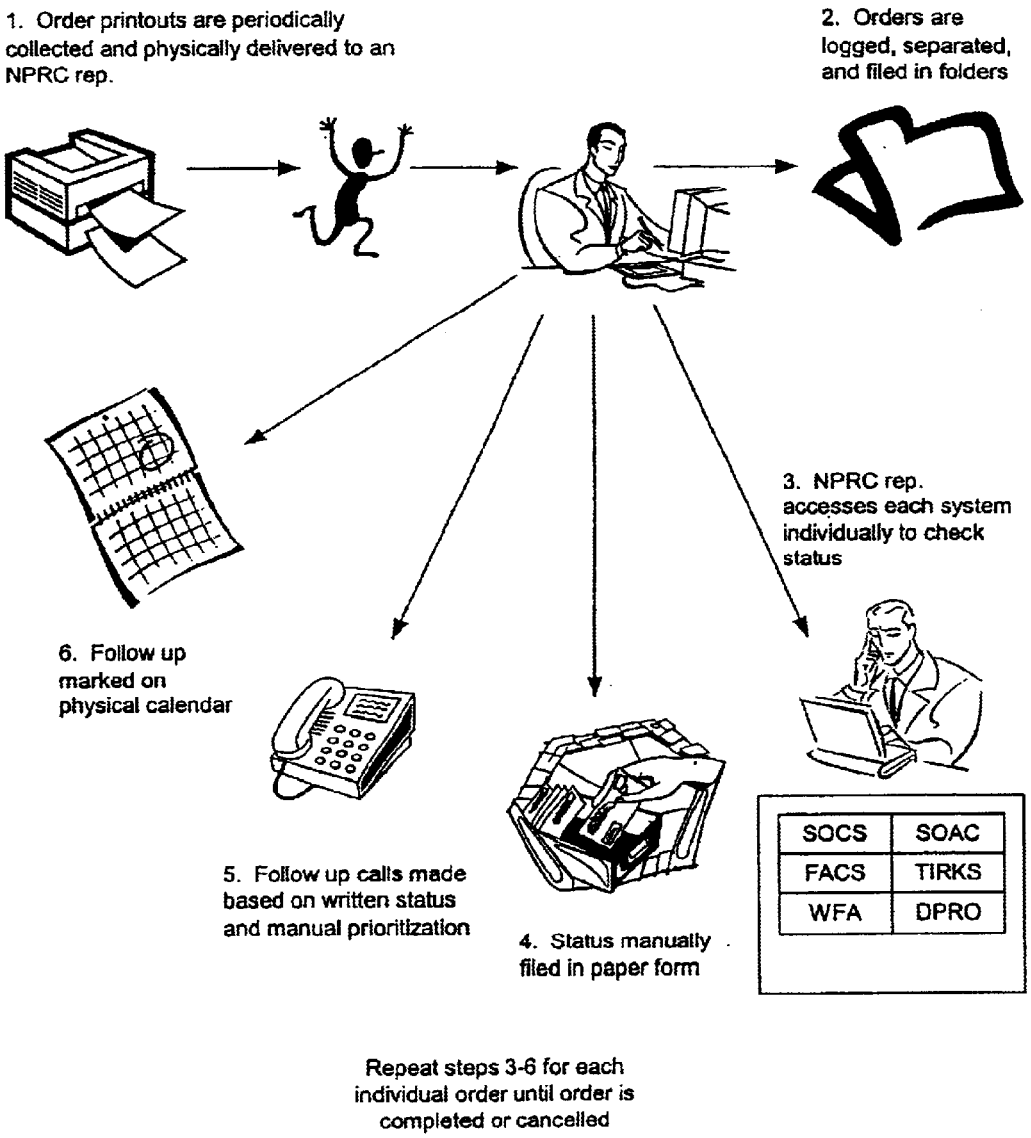
FIG. 1 depicts process flow for the prior art manual, paper-based process.
Figure 2:
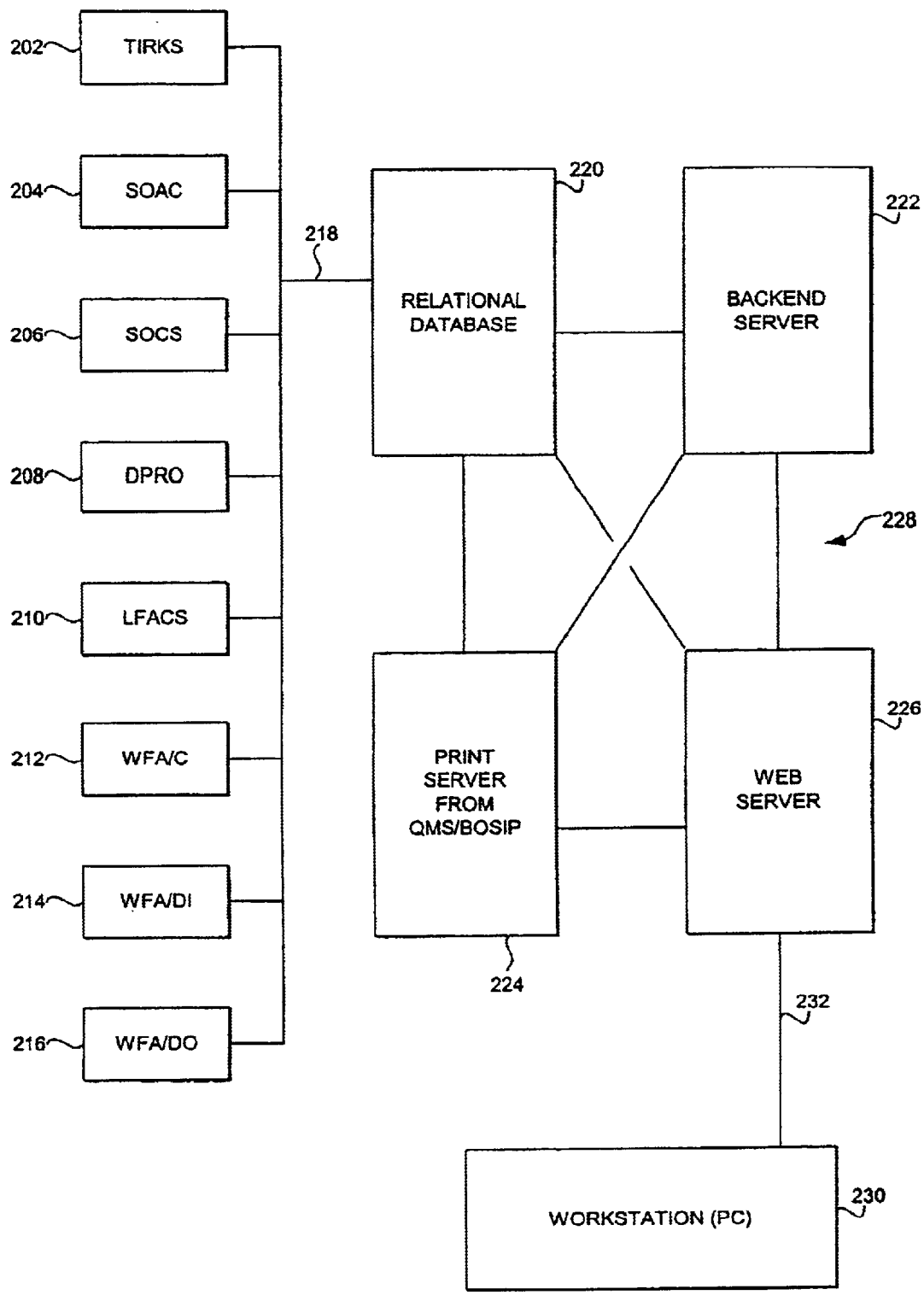
FIG. 2 shows a broad overview of the platforms and components of the strategic priority order tracking system of the present invention.

FIG. 2 shows a broad overview of an embodiment of the Strategic Priority Order Tracking (SPOT) system. There are eight Legacy databases: TIRKS 202, SOAC 204, SOCS 206, DPRO 208, LFACS 210, WFA/C 212, WFA/DI 214, and WFA/DO 216. These Legacy databases are interfaced 218 with a single relational database 220, as shown in FIG. 2. Alternatively, there may be multiple relational databases The information accessible through SPOT is maintained on a separate database. The SPOT system has a backend server 222, a print server 224, and a web server 226 which stand apart from the system's single database 220, but which are networked through various connections 228. Web server 226 manages the exchange of information between a user at his PC workstation 230 and database 220. A user interacts with SPOT through a web-connection on his personal computer. The user PC is connected to the web server via an internet connection 232, or alternatively via an intranet connection.

Figure 3:
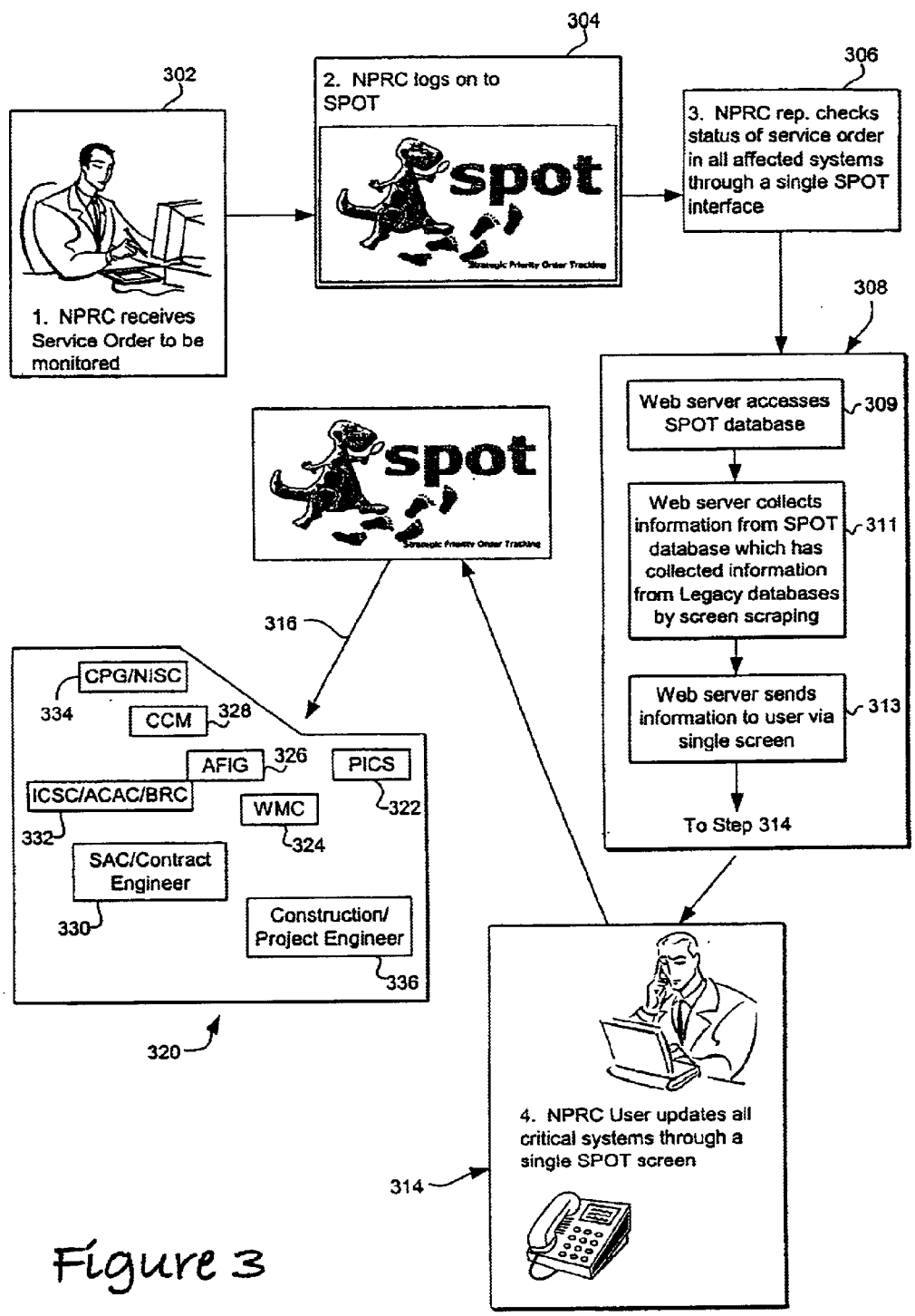
FIG. 3 shows high level process flow for the strategic priority order tracking system of the present invention.

FIG. 3 depicts high level process flow for the SPOT methods and systems. The NPRC receives a service order to be monitored at step 302. An NPRC representative logs on to the SPOT system at step 304. This is done via the web without the need for any additional software on the user's computer. At step 306, the NPRC representative checks the status of the service order in all affected Legacy systems through a single interface. The Legacy systems include a collection of databases accessed by the NPRC, such as those shown in FIG. 2.

At step 308, the web server then performs a series of tasks. At step 309, the web server accesses the SPOT database and obtains the information from the database, which has collected the information from the Legacy systems, at step 311. At step 313, the web server sends the information on the order back to the user on a single screen, which presents the information in a user-friendly interface that is easily managed. Additionally, the user can input notes into the SPOT system at step 314 and choose where that information is sent (i.e., to which Legacy system(s)— TIRKS, SOCS, and/or WFA/C). The user can also send a Firm Order Commitment ("FOC") and modify dates on an order through SPOT, whereas these things could previously only be done by multiple Legacy transactions.

Additionally, the user updates all critical systems through a single SPOT screen, alerting key provisioning groups and making follow-up telephone calls as necessary at step 314. At step 316, the appropriate provisioning groups 320 receive the necessary information through the Legacy database(s) to which they have access and perform the necessary work accordingly. The present invention further provides all provisioning groups with the ability to forecast load-balancing and work effort within their areas in order to meet Intermediate Critical Dates ("ICDs") and CDDs. The provisioning groups include Plug-In Control System ("PICS") 322, WMC 324, Address and Facility Inventory Group ("AFIG") 326, Circuit Capacity Management ("CCM") 328, SAC and Contract Engineer 330, Interstate Carrier Service Center ("ICSC"), ACAC, and Business Repair Center ("BRC") 332, and CPG 334. The Construction/Project Engineer 336 may also receive such information.

PICS 322 provides a mechanized process for the administration of plug-in equipment acquisition, movement, repair, and retirement. WMC 324 is responsible for dispatching inside (central office and center) technicians and outside technicians to meet service dates. AFIG 326 maintains inventory of the LOOP cable and electronics (LOOP is a term used to describe the facility or transport medium that delivers service from a central office to a customer location) and makes assignments on a service order to define the transport medium from the central office to the customer's location. SAC 330 is responsible for resolving facility situations to insure that the correct transport medium is available in time to meet a customer's service order. The Contract Engineer 330 is an outside plant engineer who performs functions similar to SAC.

ICSC 332 issues service orders for access and wireless services and interfaces with the external customer. ACAC 332 is responsible for the overall control and acceptance testing of an access customer's service. BRC 332 is responsible for the overall control and acceptance testing of a BBS non-access customer's service. CPG 334 designs a customer's service by interpreting the service order, validating the LOOP transport medium assigned to the order by the AFIG/ SAC, and validating the interoffice transport and central office equipment provided by CCM.

The SPOT system is an avenue through which information is placed in an efficient way into the Legacy systems and SPOT is broadcasting that information into the Legacy systems. Each provisioning group may only access one or two Legacy systems rather than all of them. Once the provisioning groups have this information, they can complete the work or tasks set forth on the particular service order. The SPOT system may also be configured to allow a user to post a remark to multiple Legacy systems, which saves the duplicate effort of providing remarks into multiple systems individually.

As part of an order tracking system, the NPRC is notified of orders falling in certain product categories. Additionally, the NPRC is notified of orders which are in danger of not being completed by specific due dates. The SPOT system searches the Legacy systems looking for particular information in which the NPRC is interested regarding certain orders. The SPOT system collects the information needed by the NPRC from the Legacy systems through a method called screen scraping, which involves the use of a program to read and evaluate data shown in the Legacy terminal screens that replicates the process that a person would follow in analyzing multiple terminals. The system knows the information it is looking for and where it is located within the different fields within each Legacy database, so it retrieves the information and then downloads it to the SPOT database for storage. The system copies the information to the SPOT database and does not remove information from the Legacy databases.

Figure 4A:
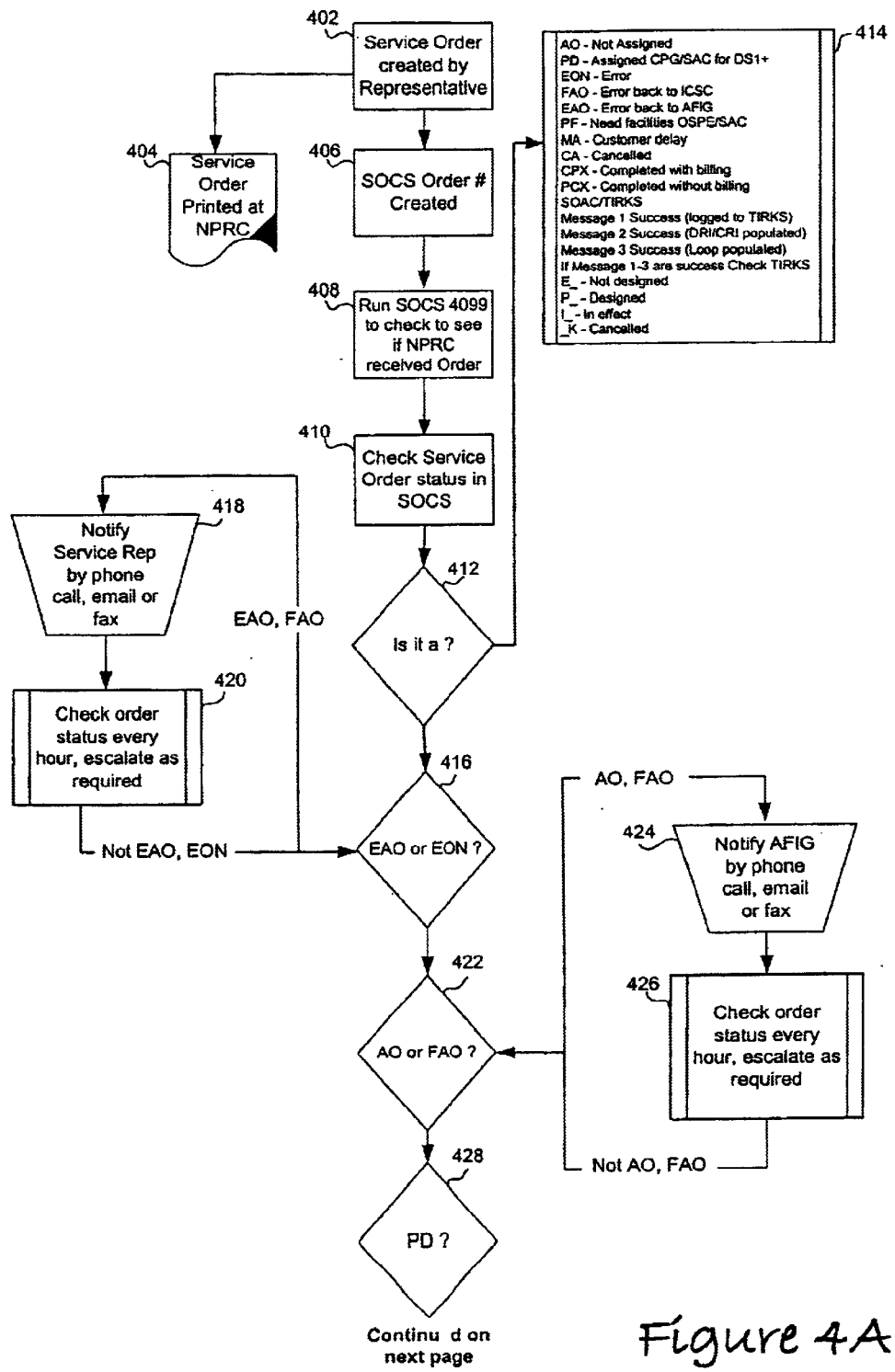
FIGS. 4A, 4B, and 4C show process flow for the strategic priority order tracking system of the present invention.
Figure 4B:
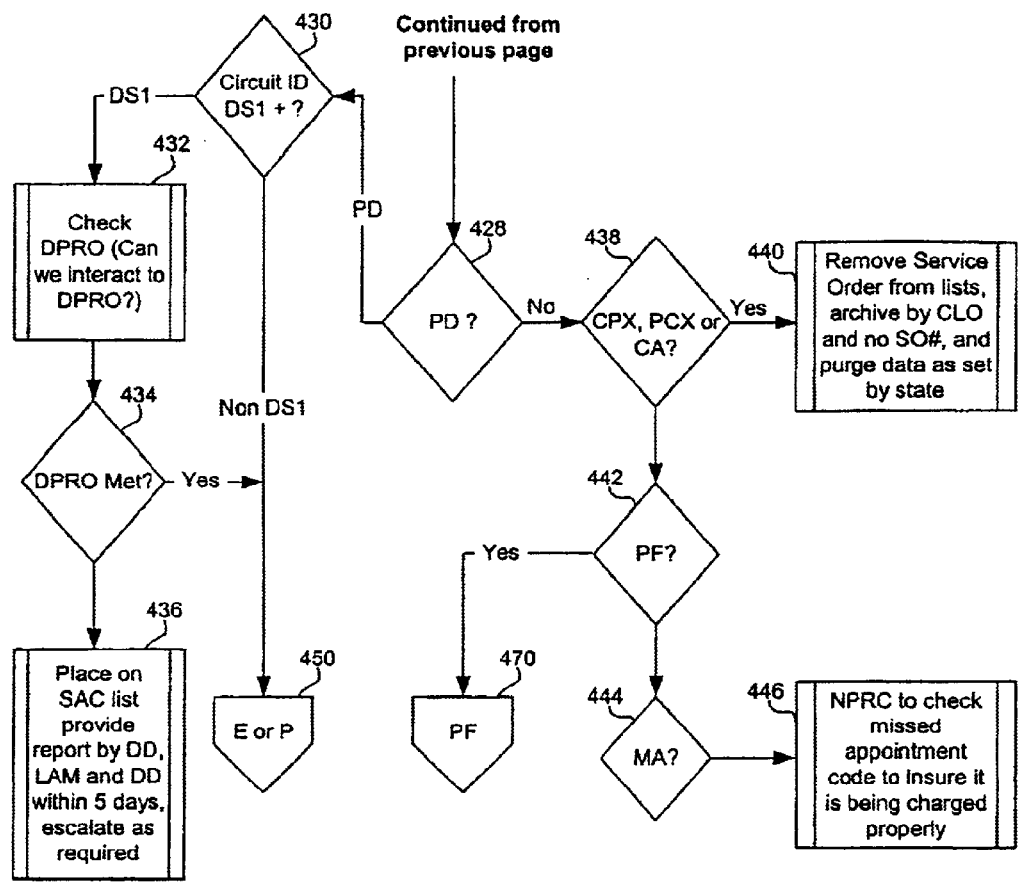
Figure 4C:
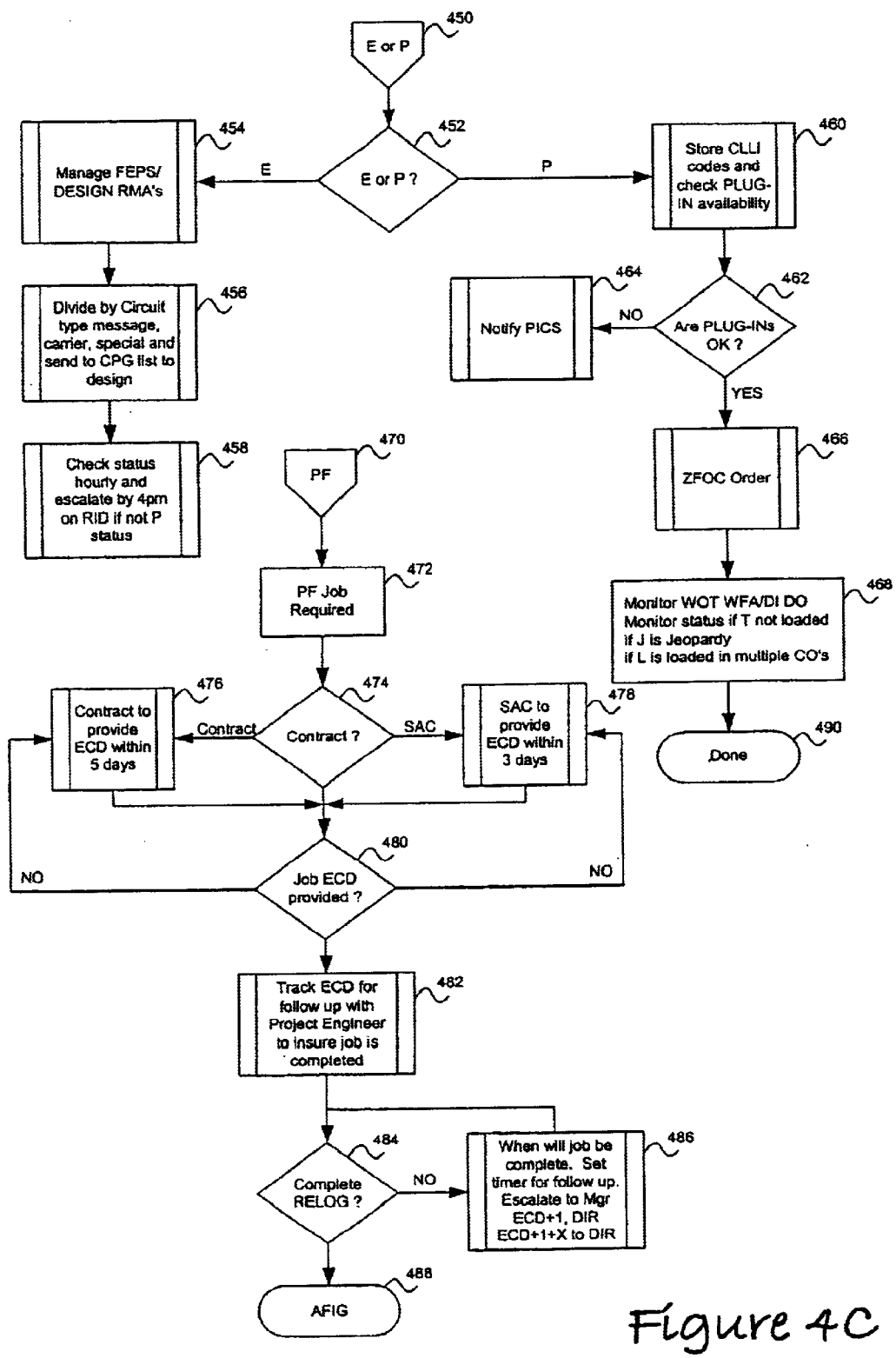

FIGS. 4A, 4B, and 4C depict the order tracking and troubleshooting process flow that occurs within the SPOT system. At step 402, a service representative issues a service order in the SOC system and, at step 406, assigns a service order number to the customer request for service. The service order flows from SOCS to downstream users such as the NPRC, and Legacy systems such as LFACS, SOAC, TIRKS, and WFA. In step 404, the system receives a copy of the order, enters the order into the Order Entry SQL table to begin tracking the order, and redelivers a paper copy of the order to the NPRC. At step 408, the system generates a SOCS 4099 forecasting report to add orders to the system which were not delivered to the NPRC printer feed. Next, the system will check the current status of all pending orders using terminal emulation in SOCS. This allows for categorization and prioritization of service orders. The system determines at step 412 what the status of the order status is among those listed in box 414. The order status is used to determine which provisioning group in the overall process is currently responsible for the order.

At step 416, if the status is EAO (error back to AFIG) or EON (error), both indicating that an error was found on the order, a service representative is notified and the system does not check other Legacy databases at step 418. At step 420, the status of the order is checked every hour and escalated as required, until the status is cleared. If the error is not cleared in time to meet the assigned service dates, the NPRC will escalate the error for resolution. At step 422, if the status is AO (not assigned) or FAO (error back to ICSC), AFIG is notified to resolve the status condition at step 424 and the status of the order is checked every hour and escalated as required at step 426, until the status is cleared. At step 428, if the status is PD (assigned CPG/SAC for DS1+), then at step 430, shown in FIG. 4B, it is determined whether the circuit ID is DS1+. If not, then the method proceeds (through 450) directly to step 452 (FIG. 4C), where a determination is made whether the status of the order is E (not designed) or P (designed). Referring now to FIG. 4B, if the circuit ID is DS1+, then, at step 432, DPRO is checked to ensure that design information for the local OSPE controlled LOOP is received. At step 434, if DPRO is met, then the method proceeds directly to step 450. If not, then at step 436, the order is placed on the SAC list provide report and escalated as required.

If the status of the order is not PD at step 428, then the method proceeds to step 438 where it is determined whether the status is CPX (completed with billing), PCX (completed without billing), or CA (cancelled). If the status order meets any of these criteria, then, at step 440, the service order is removed from lists, archived, and set for purge (once it has aged for six months). If the status of the order is PF (need facilities OSPE/SAC), then the method proceeds directly to 470 (FIGS. 4B and 4C). At step 444, if the status of the order is MA (customer delay), the method proceeds to step 446 where the NPRC checks the missed appointment code to insure the order is being charged properly.

As shown in FIG. 4C, if the status is PF, then in step 472, a PF job is required where internal construction groups build a facility transport route to serve this customer. At step 474, it is determined whether engineering for this job to provide a facility transport for this order is to be carried out by the Contract Engineer or SAC. If the Contract Engineer is responsible, then an Estimated Completion Date ("ECD") is to be provided within 5 days. In step 478, if SAC is responsible, then an ECD is to be provided within 3 days. At step 480, it is determined whether ECD was provided as required. If not, then the method returns to either step 476 or 478, according to whether the Contract Engineer or SAC is responsible for the order. If the ECD is not provided within the allocated time frame, the NPRC will escalate to the SAC or Contract Engineer. Once the ECD is provided, it is tracked by the system (and the NPRC) for follow up, at step 482, with the Project Engineer to insure that the PF job is completed, and it is escalated if the commitments are not met. At step 484, it is determined whether a Referred to Engineering Log ("RELOG") is complete. The system monitors the AFIG's RELOG list for an order to determine ownership in the provisioning process. Once the AFIG Engineering Work Order ("EWO") group completes their tasks associated with the order, the order may be moved into the LFACS system and leave PF status. If RELOG is complete, then AFIG is contacted at step 488 to complete processing of the order by creating the requested facilities in LFACS. If not, then at step 486, escalation timers are set to further completion of RELOG and the method proceeds back to step 484 to determine is RELOG is complete after a specified period of time.

Returning to FIG. 4B, once the circuit ID is determined to be non-DS1, either in step 430 or step 434, the method proceeds through 450 to step 452, shown in FIG. 4C, to determined whether the status of the order is E (not designed) or P (designed). If the status is E, then Design RMA's and Facility and Equipment Planning System ("FEPS", a TIRKS module) failures, if any, must be resolved at step 454. At step 456, a list is then sent to CPG with all of the necessary parameters for designing the appropriate circuitry. At step 458, the status is checked hourly and escalated accordingly until the design is complete and the status is changed to P.

Once the status of the order is P, the method proceeds to step 460 where CLLI codes (codes that define a physical location to the detail of frame, floor, building, address, city, and state) are stored and plug-in availability is checked further at step 462. If plug-ins are not able to be established, then PICS is notified at step 464. Once this condition is met, the status of the order is changed to a ready-for-ZFOC condition in the system at step 466. The ready-for-ZFOC condition represents BellSouth's commitment to meet a customer's service date and is a code added to a service order by a user or by the system itself. The status is further monitored at step 468 until the service order is completed at step 490.

In an embodiment of the present invention, escalation timers may be customized in order to notify NPRC users if CDD, any designed order, or ICD is at risk. This assists the provisioning process because the warnings and escalation notices are available to users as conditions occur to create these warnings and escalations. Currently, users must collect the data from multiple systems; on average 95 host transactions, and analyze the data on a periodic basis to determine if orders need additional processing or escalation to a higher level of importance. Additionally, the system collects real-time metrics to support performance analysis. To do this, SPOT stores a time stamp and a snapshot in time for an order. This allows a root cause analysis to be built for each order. SPOT stores this analysis in case of a failure. When an event is scheduled, SPOT notifies the NPRC to escalate it accordingly from a first escalation level to a third escalation level, indicating the highest priority, and the details are stored in the database.

Figure 5:
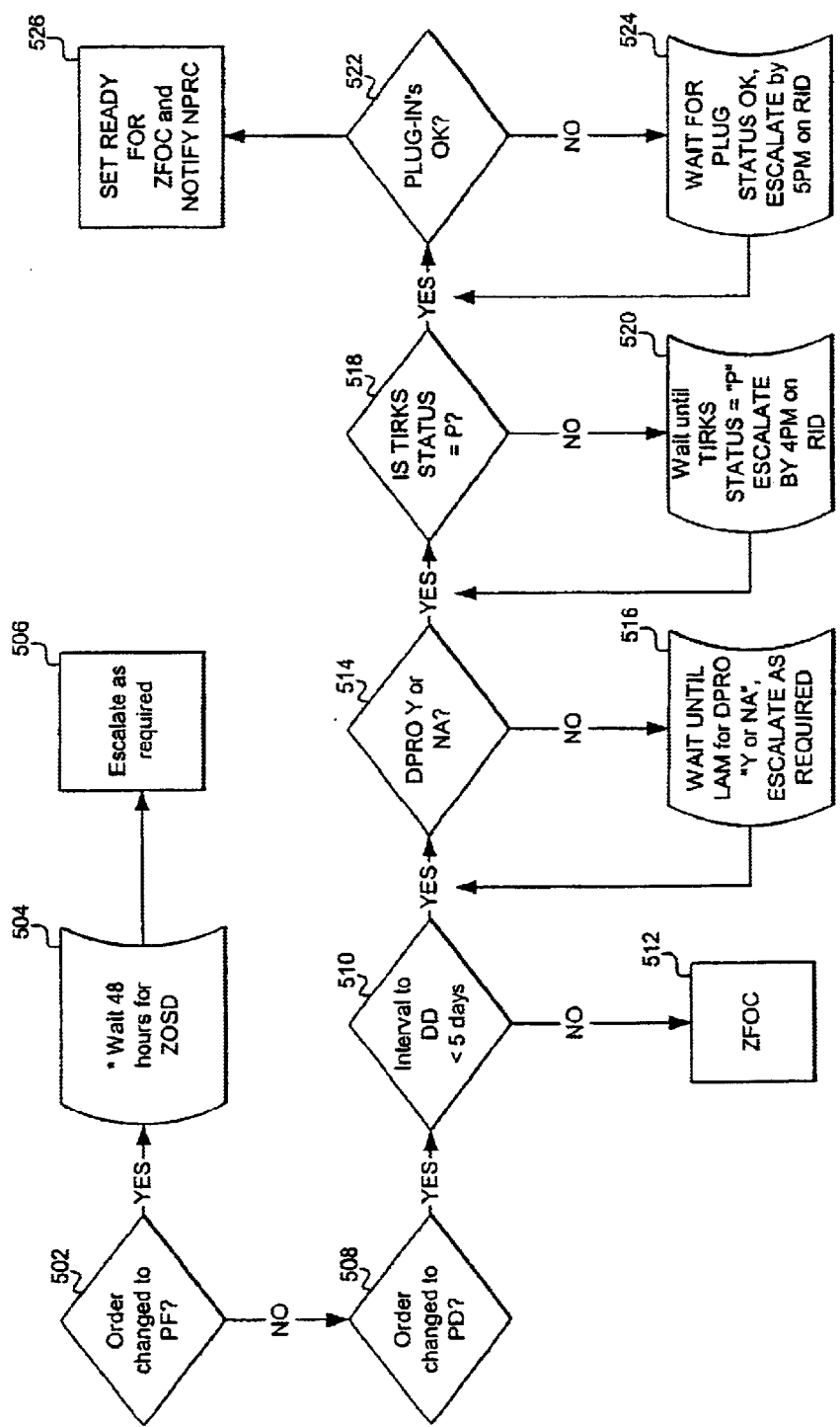
FIG. 5 shows order escalation logic that may be used in an embodiment of the present invention.
Figure 6A:
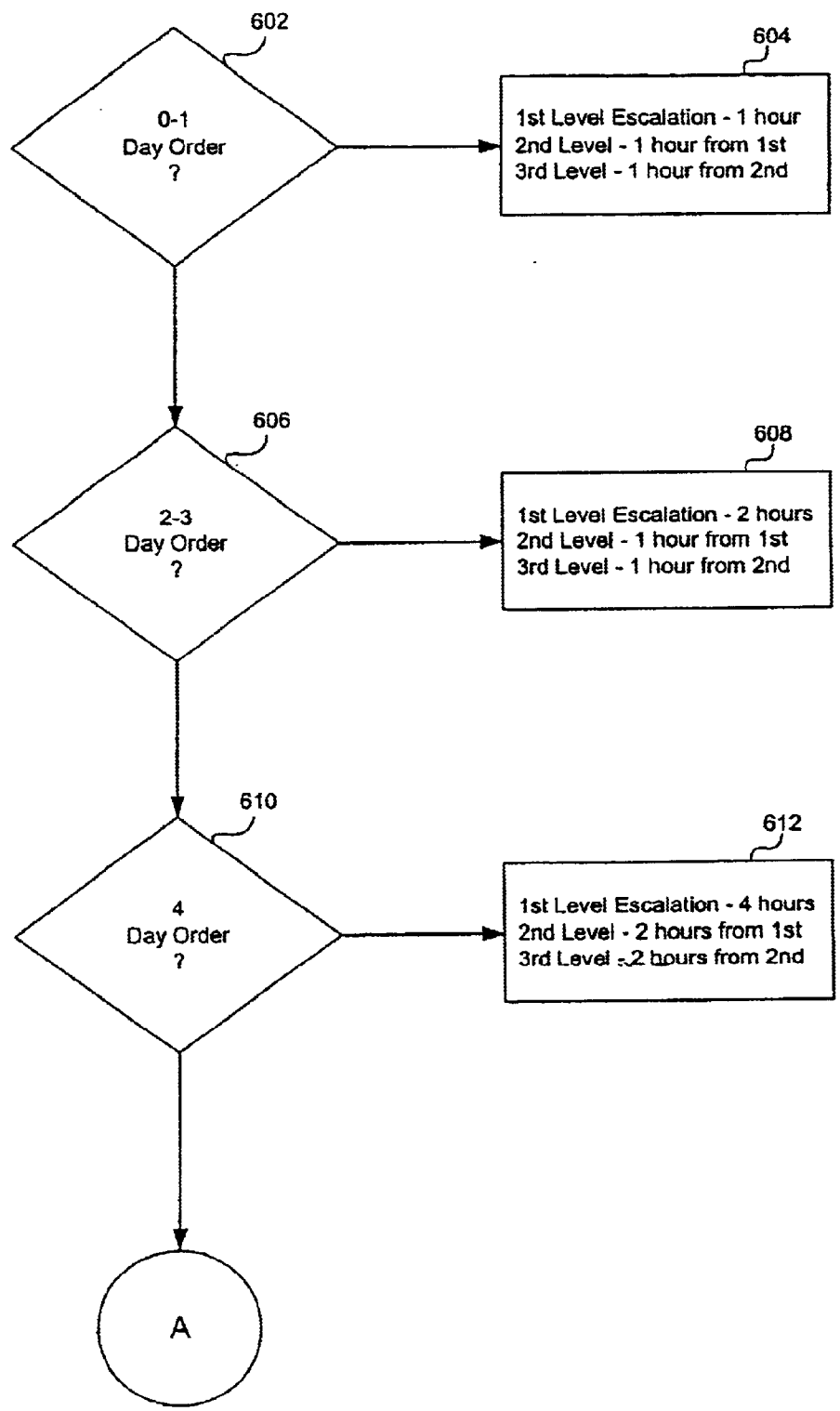
FIGS. 6A and 6B show order escalation logic that may be used in an embodiment of the present invention.
Figure 6B:
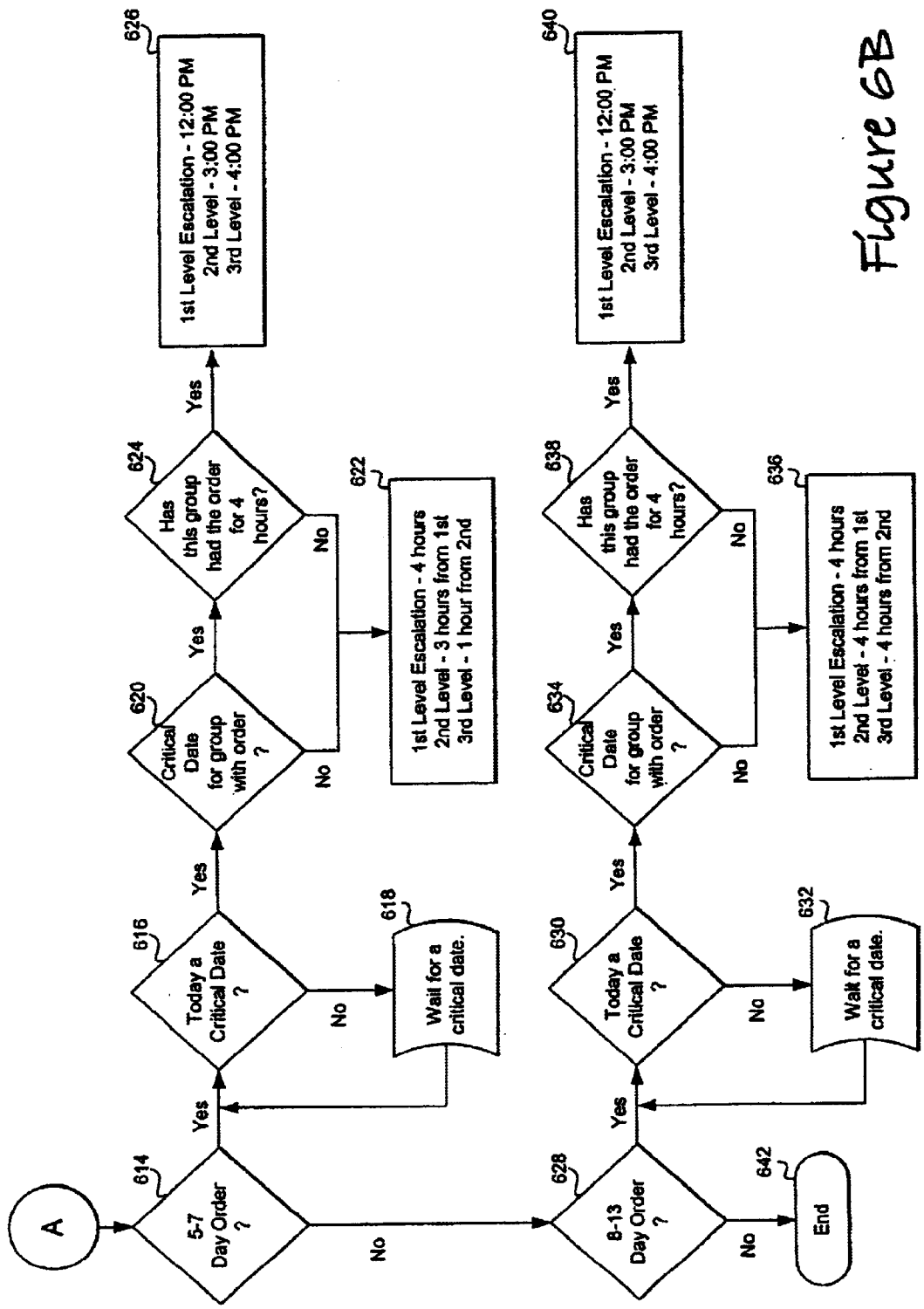

FIGS. 5, 6A, and 6B show embodiments of the order escalation process and logic within the SPOT system. In FIG. 5, at step 502, a determination is made whether an order is PF status. If so, then at step 504, the order waits for forty-eight hours until ZOSD, a code on the service order that represents the service date on a particular job for a service order, and is then escalated as required at step 506. If the order status is not PF, then the method queries whether the order status is PD at step 508. If so, then a determination is made at step 510 whether the due date is less than five days away. If not, then the order is given ZFOC status at step 512. If the due date interval is less than five days, then it is determined whether the order status with DPRO is "Y or NA" at step 514. If not, then at step 516, the system waits until the ICD Loop Assignment Met ("LAM") is completed, such that the status with DPRO is "Y or NA." The method escalates this order as required in order to meet any promised critical dates. If DPRO status is "Y or NA," then it is determined whether TIRKS status is P (designed) at step 518. If not, then the system waits until TIRKS status is P and escalates the order as required at step 520. At step 522, if TIRKS status is P, then it is determined whether plug-ins are acceptable. If not, then the system waits for plug status to be satisfied and escalates the order as necessary at step 524. Once plug-in status is met, the order is ready for ZFOC and the NPRC is notified at step 526.

FIGS. 6A and 6B provide embodiments of escalation logic that could be used within the SPOT system for orders that must be completed within zero to thirteen days. Many alternative embodiments will be obvious to those skilled in the art. All first level escalations are from the time when the provisioning group first receives the order. At step 602, it is determined whether the order must be completed within one day. If so, escalation occurs as shown in step 604, first level escalation one hour after the provisioning group receives the order, second level escalation one hour later, and third level escalation one hour after the order receives second level escalation. If an order is required to be completed in two to three days, as shown in step 606, then escalation occurs as in step 608 with first level escalation after two hours, second level escalation after one more hour, and third level escalation after an additional hour. In step 610, it is determined whether an order must be completed in four days. If so, escalation is carried out as in step 612 where first level escalation occurs after four hours, second level after two more hours, and third level two hours after second level escalation.

Referring to FIG. 6B, if an order must be completed within five to seven days, the method proceeds from step 614 to step 616, where it is determined whether today (the day the order is being examined) is a critical date. If not, the system proceeds to wait for a critical date at step 618 before returning to step 616. If today is a critical date, then the method proceeds to step 620 where it is determined whether the critical date is for the provisioning group who currently has the order to perform the required service. If not, then escalation of the order occurs as shown in step 622 where first level escalation is after four hours, second level escalation is three hours later, and third level escalation is one hour after second level escalation. If the provisioning group is the group responsible for seeing that the pending critical date is met, then it is determined whether the group had the order for more than four hours at step 624. If not, then the method proceeds to step 622 and the escalation occurs as shown there. If the group has had the order for more than four hours, then the method proceeds to step 626 and first level escalation occurs at noon, second level occurs at 3:00 p.m., and third level occurs at 4:00 p.m.

At step 628, the system determines whether an order must be completed with eight to thirteen days. If not, then the methods ends as shown in step 642. At this point, an order has passed through the system such that we now know that it is not due any time within the next thirteen days. For such orders, the system will automatically poll each required Legacy database, tracking the status and critical dates, and escalate if required.

For orders that must be completed within eight to thirteen days, it is determined whether today is a critical date at step 630. If not, the system proceeds to wait for a critical date at step 632 before returning to step 630. If today is a critical date, then the method proceeds to step 634 where it is determined whether the critical date is for the provisioning group who currently has the order to perform the required service. If not, then escalation of the order occurs as shown in step 636 where first level escalation is after four hours, second level escalation is four hours later, and third level escalation is four hours after second level escalation. If the provisioning group is the group responsible for seeing that the pending critical date is met, then it is determined whether the group had the order for more than four hours at step 638. If not, then the method proceeds to step 636 and the escalation occurs as shown there. If the group has had the order for more than four hours, then first level escalation occurs at noon, second level occurs at 3:00 p.m., and third level occurs at 4:00 p.m as shown in step 640.

In an embodiment of the present invention, the SPOT system is run on NT servers and uses a non-standard Microsoft SQL version 7 database. BOSIP is interfaced with multiple Switching Hubs which may cover different service areas or user groups. BOSIP is also interfaced with the eight Legacy databases BOSIP is connected via an Ethernet to a Host Access Server, a Host Publisher/IIS-4 WEB Server, a Print Queue Server, and a SQL7 database server. The Print Queue Server is a WIN LPD server that receives print traffic, strips data, and then delivers print traffic to the SPOT database and the NPRC. The Access Server utilizes Backend J++, Java Source, and EACL Java Beans. The database server may be either SQL 7 (nonstandard) or Oracle 8I. Finally, the Host Publisher/HIS-4 WEB Server is on the user front end and utilizes calls to the SQL or Oracle database. Because of the use of Java, this embodiment is easily transportable to other platforms such as SUN or UNIX, which are the industry standards. Additionally, the database design is using a SQL 7 database, which has the advantage of being easily able to migrate to an Oracle 8I database if desired.

Figure 7:
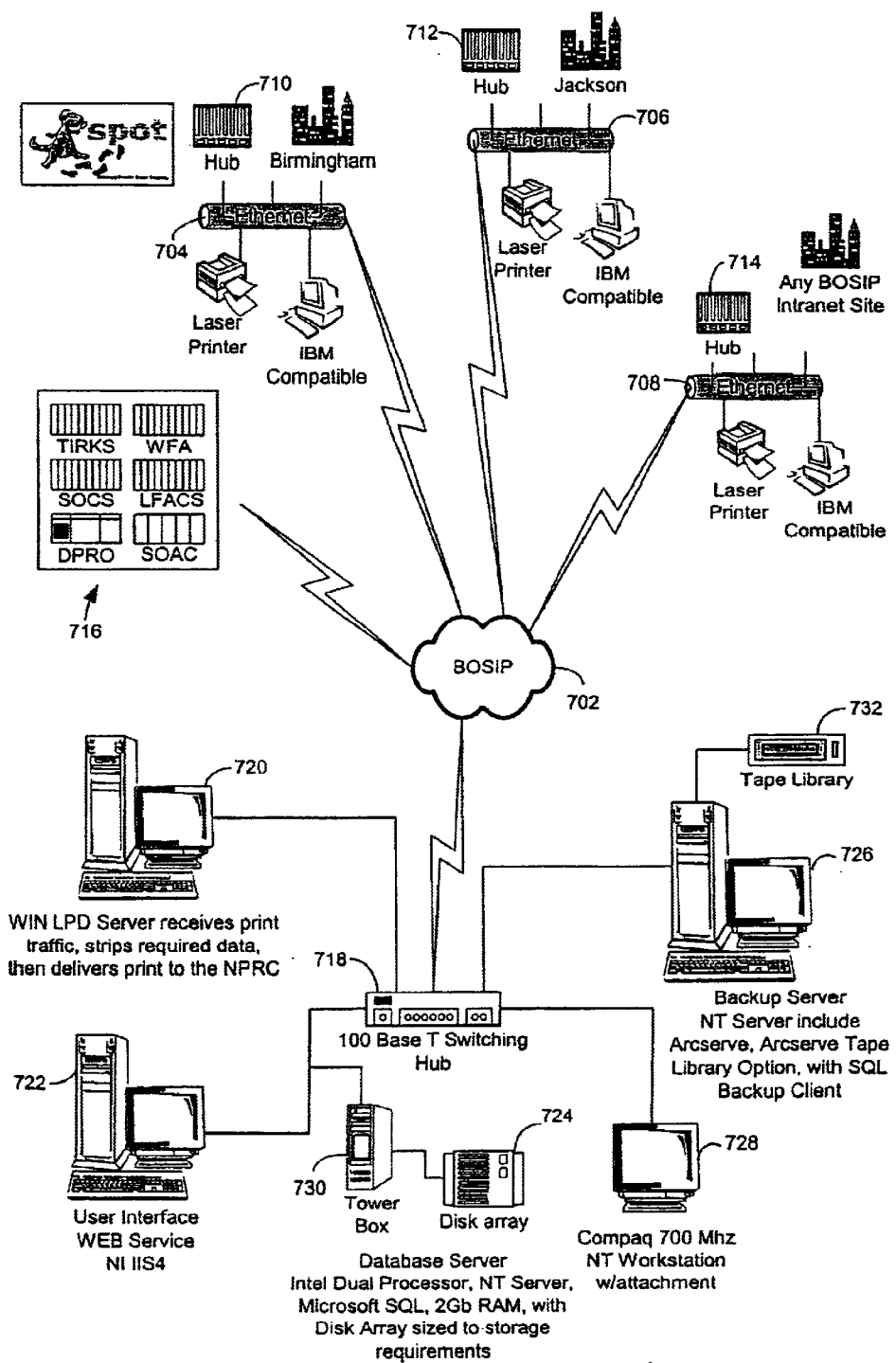
FIG. 7 shows an embodiment of the strategic priority order tracking system of the present invention.

Another embodiment includes BOSIP 702 connected via Ethernet connections 704, 706, and 708 to multiple Switching Hubs 710, 712, and 714 in different locales or service areas, as depicted in FIG. 7. BOSIP 702 is interfaced with the Legacy databases 716 including TIRKS, DPRO, SOCS, SOAC, LFACS, and the three WFA databases. BOSIP 702 is further connected to a 100 BaseT Switching Hub 718. The BaseT Switching Hub 718 is interfaced with a WIN LPD Server 720, a User Interface and Web Server 722, a Database Server 724, a Backup NT Server 726, and a PC Workstation 728. The WIN LPD Server 720 receives print traffic, strips the required data, and then delivers print data to the NPRC. The User Interface 722 includes a Web server, such as IIS4 by Microsoft. The Database server 724 includes an Intel Dual Processor, NT Server, Microsoft SQL with 2 GB RAM and a Disk Array sized depending on the storage requirements, as well as Tower Box 730. The Backup Server 726 is an NT server that includes Arcserve (a software package that allows NT and SQL backup to be mechanized, made by Computer Associates), with a tape library option and SQL Backup client. A Tape Library 732 is also interfaced with the Backup Server. The PC Workstation 728 may be, for example, a Compaq 700 MHz NT Workstation.

Figure 8:
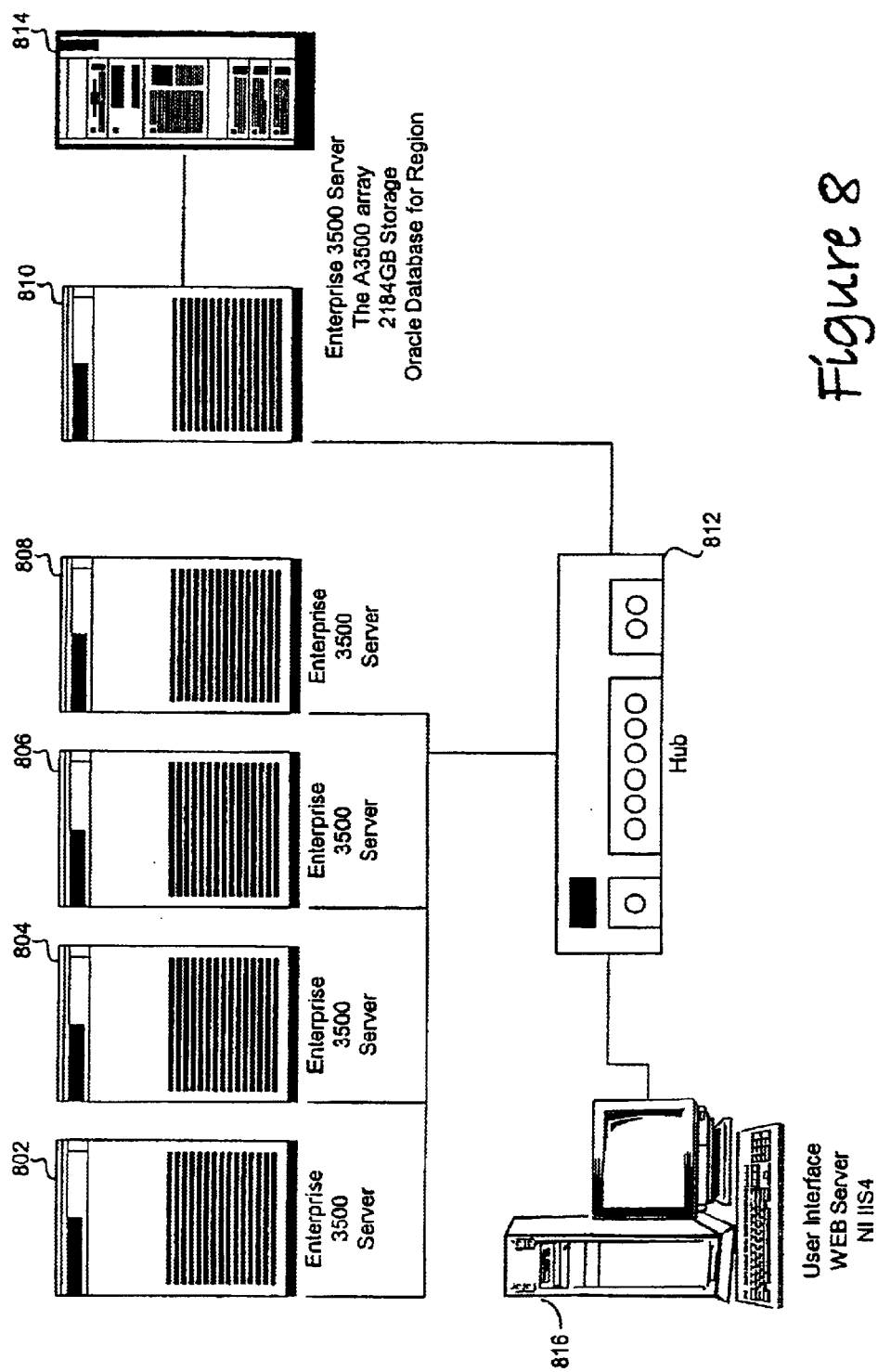
FIG. 8 shows another embodiment of the strategic priority order tracking system of the present invention.
Figure 9:
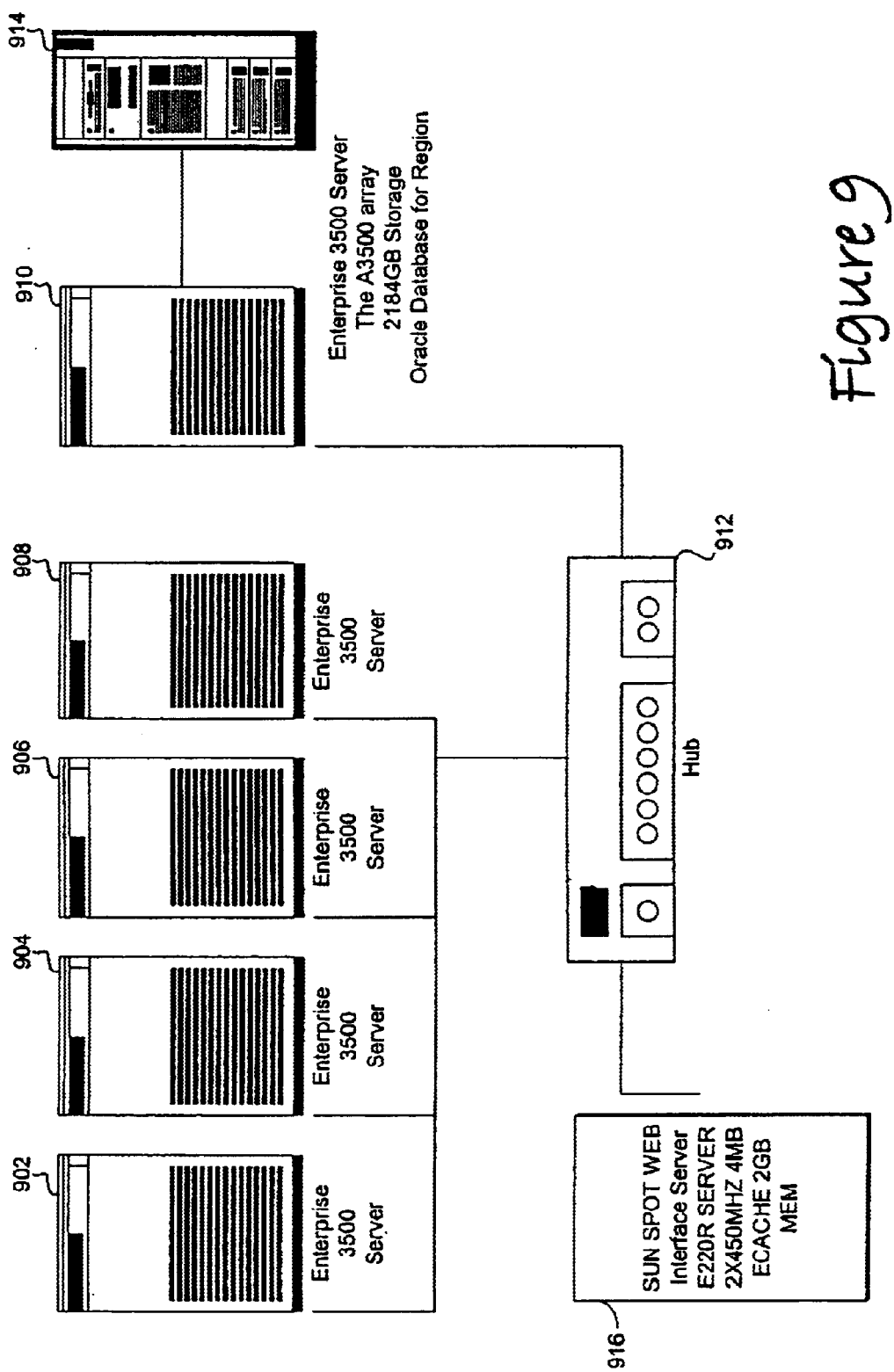
FIG. 9 shows another embodiment of the strategic priority order tracking system of the present invention.

In another embodiment, as shown in FIG. 8, depicting an 80% Unix/SUN migration to five or more Enterprise 3500 Servers 802, 804, 806, 808, and 810 are connected to a Switching Hub 812, including one server 810 which has an A3500 array, 2148 GB of storage space, and an Oracle database 814 for each region (requires UNIX/Oracle port). Also connected to the Switching Hub is a User Interface 816 with a IIS4 Web server. A further embodiment, as shown in FIG. 9, depicting a 100% Unix migration, includes a SUN SPOT Web Interface Server 916 connected to the Switching Hub 912; for example, an E220R Server with 2×450 MHz, 4 MB, and Ecache with 2 GB of memory (requires front end UNIX port and program enhancements). This embodiment is a more robust and scalable implementation of the present invention. This embodiment may be further modified by using IT standard server hardware, transferring and enhancing the prototype code from a NT and PC environment to the IT required UNIX operating system, and enhancing the software for proper robustness, run-time maintenance needs, standard Oracle databases, and desired scalability.

The present invention presents an easily navigable webpage of CDD and all designed orders critical data drawn from multiple systems presenting a single data screen to the user. It further provides content, context, and individual system-sensitive dynamic on-screen help procedures. A user will be able to position his mouse pointer over a particular field and right-click for detailed help on that field.

When a user logs on to the SPOT system, he sees a screen with a list of work orders, such as that shown in FIG. 10. FIG. 10 shows a list of work orders, with numerous characteristics for each order such as escalate level 1002, order number 1004, due date 1006, SO status 1008, TIRKS status 1010, service code 1012, group holding 1014, time to next escalation 1016, next ICD 1018, interval 1020, and ready for ZFOC 1022. The FOC designation is input into the system which alerts the ICSC, who talks to telephone companies such as AT&T or MCI and tells them when the order will be ready, met, and so on. The NPRC itself does not talk to customers.

Figure 11:
FIG. 11 shows a detailed display of information for a particular order through a single screen.
Figure 12:
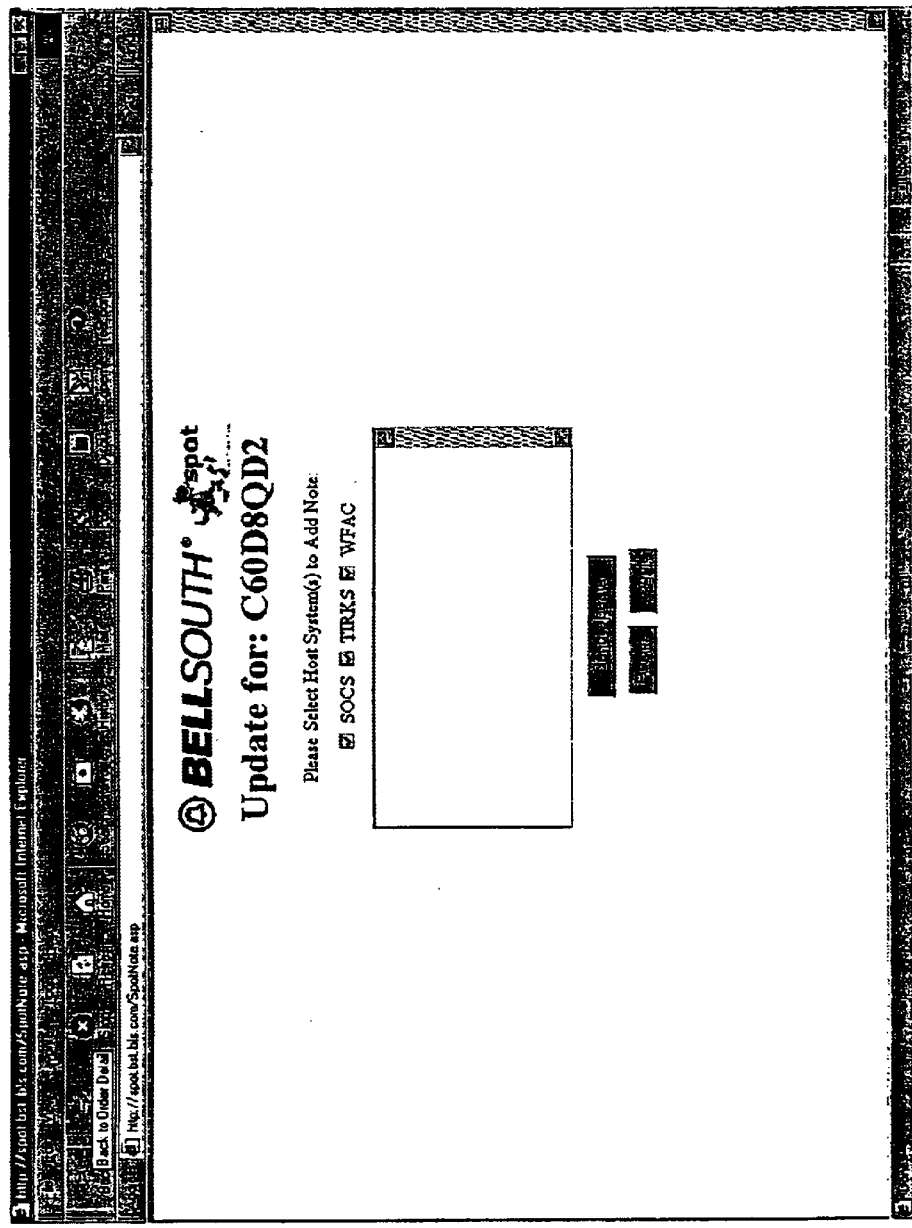
FIG. 12 shows a screen where a user can update information for a particular order in one or more Legacy systems.

The user selects an order on the web server. The web server then gets the information from the database which has collected the information from the Legacy systems. The web server sends the information on the order back to the user on a single screen, which presents the information in a user-friendly interface that is easily managed, as shown in FIG. 11. FIG. 11 shows a detailed display of information for a particular order through a single screen in the SPOT system. Additionally, the user can input notes into the SPOT system and choose where that information is sent (i.e., to which Legacy system(s)—TIRKS, SOCS, and/or WFA/C). FIG. 12 shows where a user can update information for a particular order in one or all of three Legacy systems, SOCS, TIRKS, and WFA/C, simultaneously. SPOT interacts with SOCS, TIRKS, and WFA/C in real time, so that the user does not have to leave the SPOT system to provide updated information to the Legacy databases. The user can also change dates or send a FOC through the system, whereas this previously could only be done by accessing several Legacy screens.

Figure 13:
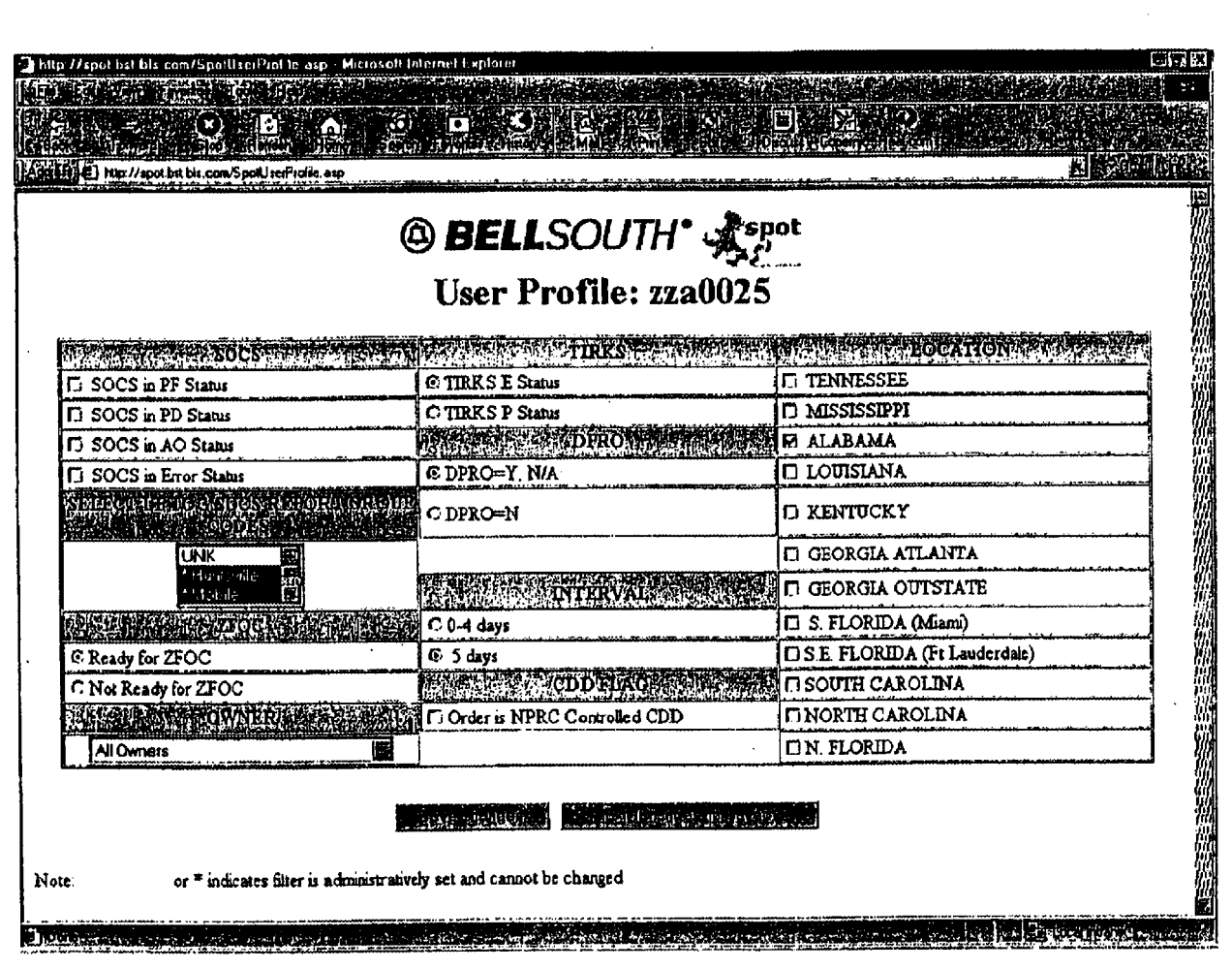

FIG. 13 depicts a user profile, which is how the user is identified for the work he will be responsible for doing. A system administrator may design a use profile associated with a user such that the user logs on to the system and sees only information which is relevant to him, such as order status for a certain state or metro service area. This is a filter for efficiency and could also be used for security purposes.

The present invention improves customer satisfaction and increases revenue. The NPRC and other similar centers are more efficient, resulting in reduced overtime and headcount, and employees have higher quality work upon the elimination of the existing manual inquiry and tracking. Another advantage is that the SPOT system is web-based, as opposed to software-based. This means that installation on individual PCs and PC problems do not affect the system and less individualized maintenance is required.

By automating most of the manual work of collecting data in the existing process, the present invention relieves pressure on NPRC users. The present invention also improves the CDD success rate and the provisioning process. The SPOT system allows for better prioritization and escalation, which improves ICD completions and cuts down overhead and overtime costs of these groups associated with rushing to complete a job. Improvement in each ICD completion has a positive ripple effect on subsequent ICD completions in the same work order. Additionally, automatic prioritization of orders allows the NPRC to target escalation in the correct order and thereby improve CDD completion percentage levels.

The present invention allows the NPRC to process the current volume of orders in less time, providing the NPRC additional time to perform better follow up on orders and to take on other types of orders using the same resources. The SPOT system allows for collection of critical data that enables the NPRC and other groups to perform root cause analysis for delayed orders and analyze their productivity. Improvement in the overall provisioning process results from improvement in the performance of ICDs (such as LAM, Record Issue Date ("RID"), and Wired Office Tested ("WOT")), improvement in FOC performance for the network center, and improvement in CDD performance.

With the present invention, NPRC users do not have to spend time recording statuses on paper, organizing paper files, and struggling for prioritization. The present invention collects the status of all service orders within one hour of real time and prioritize the service orders to be escalated. This allows NPRC users to concentrate on making phone calls for escalation and following up with various provisioning groups. Additionally, with increased efficiency, more time is available for current NPRC users to track and manage BBS service orders as well as other kinds of service orders.

The foregoing is provided for purposes of illustrating, explaining, and describing embodiments of the present invention. Modifications and adaptations to these embodiments will be apparent to those skilled in the art and may be made without departing from the scope or spirit of the invention.

We claims:

1. A system for telecommunications order processing and monitoring comprising:

a plurality of Legacy databases;

a database interfaced with the Legacy databases, data in the Legacy databases being collected in the database;

a workstation having a graphical user interface; and a web server connected between the database and the workstation, wherein the workstation receives a service order, accesses the web server if a status of the service order meets a predetermined criterion, and displays corresponding to the service order collected from the Legacy databases through the database and the web server.

2. The system of claim 1, wherein the plurality of Legacy databases includes TIRKS, SOAC, SOCS, WFA/C, WFA/DI, WFA/DO, DPRO, and LFACS.

3. The system of claim 1, wherein the workstation further receives updated d a and inputs the updated data into at least one of the Legacy databases through the web server and the database.

4. The system of claim 1, further comprising a printer server and a backend server connected to the Legacy databases, the database, the workstation, and the web server through a network.

5. In a telecommunications system for order processing and monitoring comprising a plurality of Legacy databases, a database, a web server, and a workstation, a method for processing and monitoring telecommunications service orders comprising:

collecting information of the Legacy databases into the database interfaced with the Legacy databases;

receiving identifying information associated with a customer service order from the workstation;

utilizing the identifying information to determine the status of the order;

accessing the web server connected between the database and the workstation to search information corresponding to the customer service order from the Legacy databases, if the status of the customer service order meets a predetermined criterion; and transmitting the information corresponding to the customer service order to the workstation.

6. The method of claim 5, further comprising updating the status of the order in the database based on addition information received from the workstation.

7. The method of claim 6, further comprising transmitting the undated status of the order to the database.

8. The method of claim 6, further comprising transmitting the updated status of the order to at least one of the plurality of Legacy databases and to at least one of a plurality of provisioning groups responsible for performing the labor requested on the order.

9. The method of claim 5, wherein accessing the web server comprises checking the status of the customer service order every predetermined time, if the status of the customer service order doe not meet the predetermined criterion.

10. The method of claim 5, wherein accessing the web server is performed in real time.

11. The method of claim 5, wherein the identifying information includes a error, assignment information associated with the customer service order, customer delay or billing information.

12. In a telecommunications system for order processing and monitoring comprising a plurality of Legacy databases, a database, a web server, and a workstation, a method for processing and monitoring telecommunications service orders comprising:

collecting information of the Legacy databases into the database interfaced with the Legacy databases;

receiving identifying information associated with a customer service order from the workstation;

utilizing the identifying information to determine the status of the order;

accessing the web server connected between the database and the workstation to search information corresponding to the customer service order, if the status of the customer service order meets a predetermined criterion;

transmitting the information corresponding to the customer service order to the workstation;

transmitting the status of the order to at least one of a plurality of provisioning groups responsible for performing the labor requested on the order; and escalating a priority level associated with the order.

13. The method of claim 12, wherein escalating a priority level associate with the order further comprises determining an interval of time by which the labor requested on the order must be completed.

14. The method of claim 12, wherein escalating a priority level associated with the order further comprises determining whether a critical data has been reached.

15. The method of claim 12, wherein escalating a priority level associated with the order further comprises:

determining whether the at least one of a plurality of provisioning groups responsible for performing the labor requested on the order received the order within a specified period of time; and in response, adjusting the priority level associated with the order according to whether the at least one of a plurality of provisioning groups received the order within the specified time.

16. The method of claim 12, wherein accessing the web server checking the status of the customer service order every predetermined time, if the status of the customer service order doe not meet the predetermined criterion.

17. The method of claim 12 wherein accessing the web server is perform in real time.

\* \* \* \* \*